N. A. DONALD.
SPARK ARRESTER.
APPLICATION FILED AUG. 19, 1918.
1,302,328.
Patented Apr. 29, 1919.
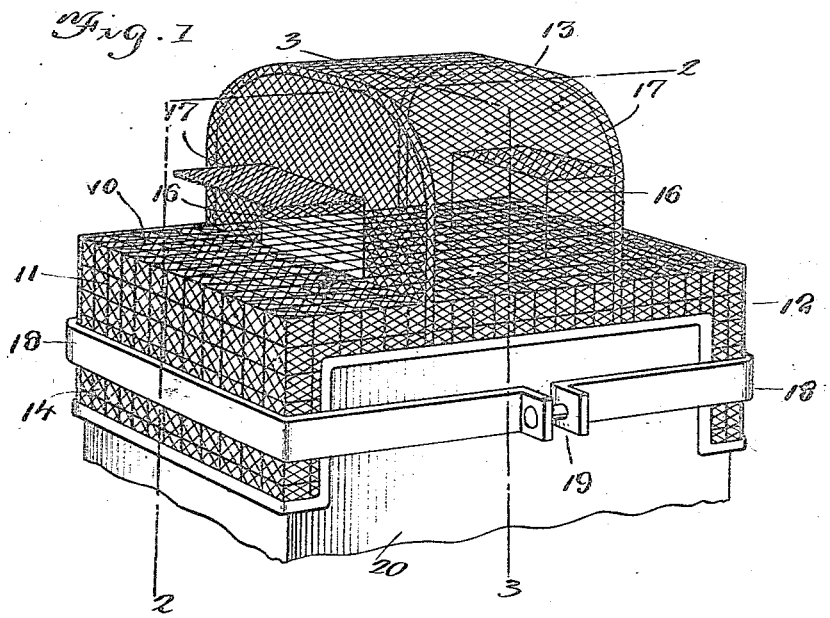
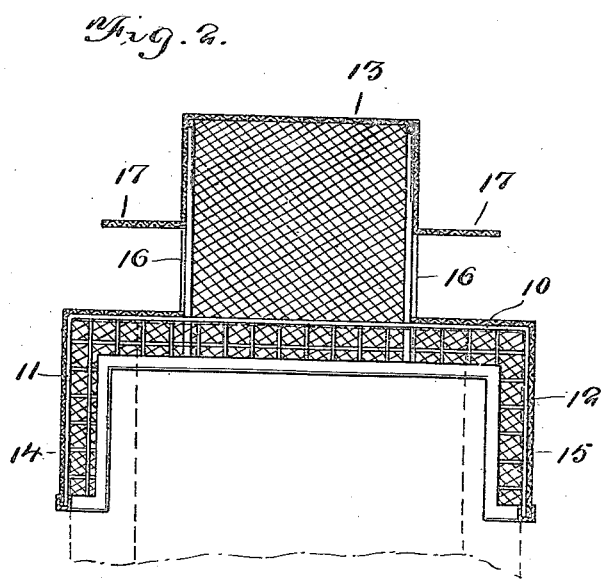
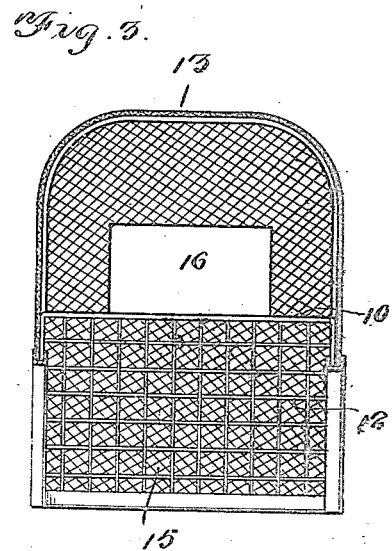
Witnesses
E. R. Ruppert.
Inventor
Nannie A. Donald
By Victor J. Evans
Attorney

UNITED STATES PATENT OFFICE.

NANNIE A. DONALD, OF MERIDIAN, MISSISSIPPI.

SPARK-ARRESTER.

1,302,328.   Specification of Letters Patent.   Patented Apr. 29, 1919.

Application filed August 19, 1918. Serial No. 250,563.

*To all whom it may concern:*

Be it known that I, NANNIE A. DONALD, a citizen of the United States, residing at Meridian, in the county of Lauderdale and State of Mississippi, have invented new and useful Improvements in Spark-Arresters, of which the following is a specification.

This invention relates to spark arresters and aims to provide a device adapted to be upon the top of a chimney or flue for the purpose of preventing the passage of sparks.

To this end the invention includes a substantially rectangular screen formed of woven wire and provided with side and end flanges for contact with the sides and ends of the flue, the said screen being adapted to be positioned transversely of the top of the flue, while an additional screen of relatively small mesh is secured thereto in a manner to provide a dome shaped chamber disposed transversely above the first mentioned screen, the side and end walls of the dome shaped chamber being extended to cover the sides and ends of the first mentioned screen, while the sides of said chamber are further provided with openings having free hanging top flanges.

The invention also consists of the following novel details of construction, combination and arrangement of parts to be hereinafter more fully described and illustrated in the accompanying drawings.

In the drawings:—

Figure 1 is a perspective view of the spark arrester embodying the present invention shown in position upon a flue;

Fig. 2 is a longitudinal vertical sectional view thereof on the line 2—2 of Fig. 1 with the flue shown by dotted lines; and Fig. 3 is a cross section on the line 3—3 of Fig. 1, the flue being omitted.

Referring to the drawings in detail like characters of reference denote corresponding parts throughout the several views.

As illustrated in the accompanying drawings, the invention includes a substantially rectangular screen 10 formed of woven wire and having its sides and ends provided with right angularly extending side and end flanges 11 and 12 respectively.

Secured to the screen 10 in any desired manner, is an additional screen 13 of relatively small wire mesh, this latter screen being substantially dome shaped and positioned transversely across the screen 10. The side and end walls of the second screen are extended over the sides and ends of the screen 10 as indicated at 14 and 15 and are secured thereto in any preferred manner, thereby forming a cover for the sides and ends of the screen 10. Each of the side walls of the chamber 13 are formed with oppositely disposed openings 16, the latter being provided with outwardly extending top flanges 17 as shown. In the use of the device the arrester is positioned transversely of the flue 20 over the sides and ends thereof in contact with the sides and ends of the said flue so as to close the end of the flue. The sparks contact with the screen 10, these sparks sufficiently small passing through the screen and being arrested for contact with the walls of the dome shaped chamber 13. The openings 16 are for the purpose of providing an obstruction draft opening and any sparks blowing through these openings will be arrested by contact with the flanges 17.

The device may be secured in position by two angular shaped rods 18 which have their ends secured together by threaded coupling members 19, to form clamping bands around the spark arrester and flue to clamp the former over the open end of the latter.

The invention is susceptible of various changes in its form, proportions and minor details of construction and the right is reserved to make such changes.

Having described the invention, what is claimed is:—

1. A spark arrester embodying a screen formed of wire mesh and adapted to be placed transversely across the flue, side and end flanges extending from said screen, a second screen secured over and covering the first mentioned screen, said second screen being formed into a central transversely disposed dome shaped chamber, the top wall of which is spaced above the first mentioned screen and the side walls spaced inwardly from the end of said first mentioned screen and provided with openings at their lower ends.

2. A spark arrester embodying a screen formed of wire mesh and adapted to be placed transversely across the flue, side and end flanges extending from said screen, a second screen secured over and covering the first mentioned screen, said second screen being formed into a central transversely disposed dome shaped chamber, the top wall of which is spaced above the first mentioned screen and the side walls spaced inwardly from the end of said first mentioned screen and provided with openings at their lower ends and outwardly extending flanges projecting from the top of said openings.

In testimony whereof I affix my signature.

NANNIE A. DONALD.